(12) United States Patent
Tohge et al.

(10) Patent No.: US 10,843,692 B2
(45) Date of Patent: Nov. 24, 2020

(54) VEHICLE CONTROL SYSTEM

(71) Applicant: TOYOTA JIDOSHA KABUSHIKI KAISHA, Toyota (JP)

(72) Inventors: Norihito Tohge, Susono (JP); Takashi Chiba, Gotemba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 91 days.

(21) Appl. No.: 16/219,230

(22) Filed: Dec. 13, 2018

(65) Prior Publication Data
US 2019/0225215 A1 Jul. 25, 2019

(30) Foreign Application Priority Data

Jan. 23, 2018 (JP) .................................. 2018-008742

(51) Int. Cl.
| | |
|---|---|
| *B60W 30/095* | (2012.01) |
| *B60W 50/00* | (2006.01) |
| *G01S 13/86* | (2006.01) |
| *G01S 13/42* | (2006.01) |
| *G01S 17/42* | (2006.01) |
| *G01S 17/931* | (2020.01) |

(Continued)

(52) U.S. Cl.
CPC .... *B60W 30/0953* (2013.01); *B60W 50/0097* (2013.01); *G01S 13/42* (2013.01); *G01S 13/865* (2013.01); *G01S 13/867* (2013.01); *G01S 17/42* (2013.01); *G01S 17/931* (2020.01); *B60W 2420/52* (2013.01); *B60W 2554/00* (2020.02); *B60W 2900/00* (2013.01); *G01S 13/876* (2013.01); *G01S 13/931* (2013.01); *G01S 2013/93271* (2020.01)

(58) Field of Classification Search
CPC ......... B60W 30/0953; B60W 50/0097; B60W 2554/00; B60W 2420/52; B60W 2900/00; B60W 2420/42; B60W 2554/4041; B60W 30/09; B60W 30/095; B60W 30/14; B60W 40/04; G01S 17/931; G01S 13/42; G01S 17/42; G01S 13/865; G01S 13/867; G01S 2013/93271; G01S 13/876; G01S 13/931
See application file for complete search history.

(56) References Cited

U.S. PATENT DOCUMENTS

2006/0155469 A1 * 7/2006 Kawasaki ............. G01S 13/931
701/301
2017/0106861 A1 * 4/2017 Oh ....................... B60W 30/143

FOREIGN PATENT DOCUMENTS

JP 3835438 B2 10/2006

* cited by examiner

*Primary Examiner* — Aniss Chad
*Assistant Examiner* — Chase L Cooley
(74) *Attorney, Agent, or Firm* — Sughrue Mion, PLLC

(57) ABSTRACT

A technology is provided in which not only the information on the first preceding vehicle ILV but also the information on the preceding vehicle group LVG ahead of the first preceding vehicle ILV is applied to the travel assist control. Firstly, specification processing of a preceding vehicle LV on the own lane is executed (step S1). Subsequently, landmark information on the preceding vehicle LV is graded (step S2). Subsequently, a shielding ratio SR of the preceding vehicle LV belonging to the preceding vehicle group LVG is calculated for each preceding vehicle LV (step S3). Subsequently, determination processing is executed whether or not to apply the information on the preceding vehicle group LVG to travel assist control (step S4).

3 Claims, 6 Drawing Sheets

(51) Int. Cl.
*G01S 13/931* (2020.01)
*G01S 13/87* (2006.01)

VEHICLE CONTROL SYSTEM

CROSS-REFERENCE TO RELATED APPLICATION

The present disclosure claims priority under 35 U.S.C. § 119 to Japanese Patent Applications No. 2018-008742, filed on Jan. 23, 2018. The contents of these applications are incorporated herein by reference in their entirety.

TECHNICAL FIELD

The present disclosure relates to a vehicle control system.

BACKGROUND

JP 3835438 B discloses a control system in which information on a first preceding vehicle and a second preceding vehicle is applied to a vehicle control. The first preceding vehicle is a preceding vehicle traveling in front of the own vehicle on a lane along which the own vehicle travels (hereinafter also referred to as an "own lane"). The second preceding vehicle is a preceding vehicle traveling along the own lane one before the first preceding vehicle. In other words, the second preceding vehicle is a preceding vehicle which travels along the own lane two vehicles before the own vehicle.

In this control system, the information on the second preceding vehicle is acquired from a millimeter wave radar and a camera device. The millimeter wave radar specifies a position of the second preceding vehicle. The camera device processes an image data ahead of the own vehicle. After the processing of this image data, when the second preceding vehicle is grasped at the position specified by millimeter wave radar, the information on the second preceding vehicle is applied to the vehicle control of the own vehicle as information on the second preceding vehicle.

According to the millimeter wave radar, even if the first preceding vehicle exists, it is possible to grasp the position of the second preceding vehicle. The reason for this is that radio waves of the millimeter wave radar is able to transmit so as to wrap around obstacles. On the other hand, it is sometimes difficult for the camera device to grasp the position of the second preceding vehicle. The reason for this is that when the second preceding vehicle is hidden in the first preceding vehicle, data amount of the second preceding vehicle included in the image data decreases. Therefore, in the above control system, when the second preceding vehicle is unable to be grasped at the position specified by millimeter wave radar in the processing of image data, information indicating that is obtained. In this case, therefore, the information on the second preceding vehicle is not applied to the vehicle control of the own vehicle.

From a viewpoint of safety to prevent occurring a collision between the first preceding vehicle and the own vehicle, it is desirable to apply to the vehicle control of the own vehicle not only the information on the second preceding vehicle but also information on a preceding vehicle group traveling along the own lane ahead of the second preceding vehicle. In this respect, the above control system is assumed to grasp an entire rear portion of the second preceding vehicle by the camera device. Therefore, if one part of the entire rear portion is hidden is hidden in the first preceding vehicle, it is handled that the second preceding vehicle is unable to be grasped.

The present disclosure addresses the above described problem, and an object of the present disclosure is, to provide a technology which is able to apply information on a preceding vehicle group traveling along the own lane ahead of the first preceding vehicle to the vehicle control of the own vehicle even if rear portions of the same preceding vehicle group are somewhat hidden.

SUMMARY

A first aspect of the present disclosure is a vehicle control system for solving the problem described above and has the following features.

The vehicle control system includes a millimeter wave radar, a camera device or LIDER, an actuator and a controller.

The millimeter wave radar is configured to acquire positional information on a plurality of preceding vehicles traveling along an own lane in front of an own vehicle.

The camera device or the LIDER is configured to acquire outer shape information on rear portions of the preceding vehicles.

The actuator is configured to operate when there is a high possibility that the own vehicle collides with a first preceding vehicle traveling along the own lane ahead of the own vehicle.

The controller is configured to control the actuator based on the positional information and the outer shape information.

The controller is further configured to:
grade the positional information and the outer shape information in association with each other and arrange the grading result as information on each preceding vehicle;
specify first and second end points of each rear portion in a vehicle's width direction based on the outer shape information which was associated with the positional information;
when the first and second end points are specified, calculate a first angle and a second angle for each preceding vehicle of which the first and second end points were specified, wherein the first angle is formed by a virtual line extending in a travel direction of the own vehicle through a reference point of the own vehicle and a line segment connecting the first end point and the reference point, and the second angle is formed by the virtual line and a line segment connecting the second end point;
when a difference between the first and second angles is smaller than a threshold in at least one of two preceding vehicles of which the first and second end points were specified, calculate a shielding ratio of a far-ahead vehicle having a longer distance from the own vehicle within the two preceding vehicles by a near-ahead vehicle having a shorter distance from the own vehicle within the two preceding vehicles; and
determine whether information on a preceding vehicle group traveling along the own lane ahead of the first preceding vehicle is applied to the control of the actuator based on the shielding ratio.

A second aspect of the present disclosure has the following features according to the first aspect.

The controller is configured to calculate the shielding ratio by dividing an included angle with a threshold, wherein the included angle is formed by a first line segment connecting the first end point of the far-ahead vehicle and the reference point and a second line segment connecting the second end point of the far-ahead vehicle and the reference point, and the threshold is set in accordance with a distance from the own vehicle to the far-ahead preceding vehicle.

A third aspect of the present disclosure has the following features according to the first aspect.

The controller is configured to calculate the shielding ratio by dividing a length of a third line segment with a threshold, wherein the third line segment is a line segment between the first and second end points of the far-ahead preceding vehicle, and the threshold is set in accordance with a distance from the own vehicle to the far-ahead preceding vehicle.

According to the first aspect, the shielding ratio is calculated for each preceding vehicle of which the first and second end points are specified. Therefore, even if a rear portion of a preceding vehicle belonging to the preceding vehicle group is somewhat hidden by the first preceding vehicle, it is possible to determine based on the shielding ratio whether information on the same preceding vehicle is applied to the control of the actuator. Therefore, it is possible to positively apply the information on the same preceding vehicle to the vehicle control of the own vehicle.

According to the second aspect, it is possible to calculate the shielding ratio with the included angle.

According to the third aspect, it is possible to calculate the shielding ratio with the length of the far-ahead preceding vehicle.

DESCRIPTION OF EMBODIMENT

Figure 1:
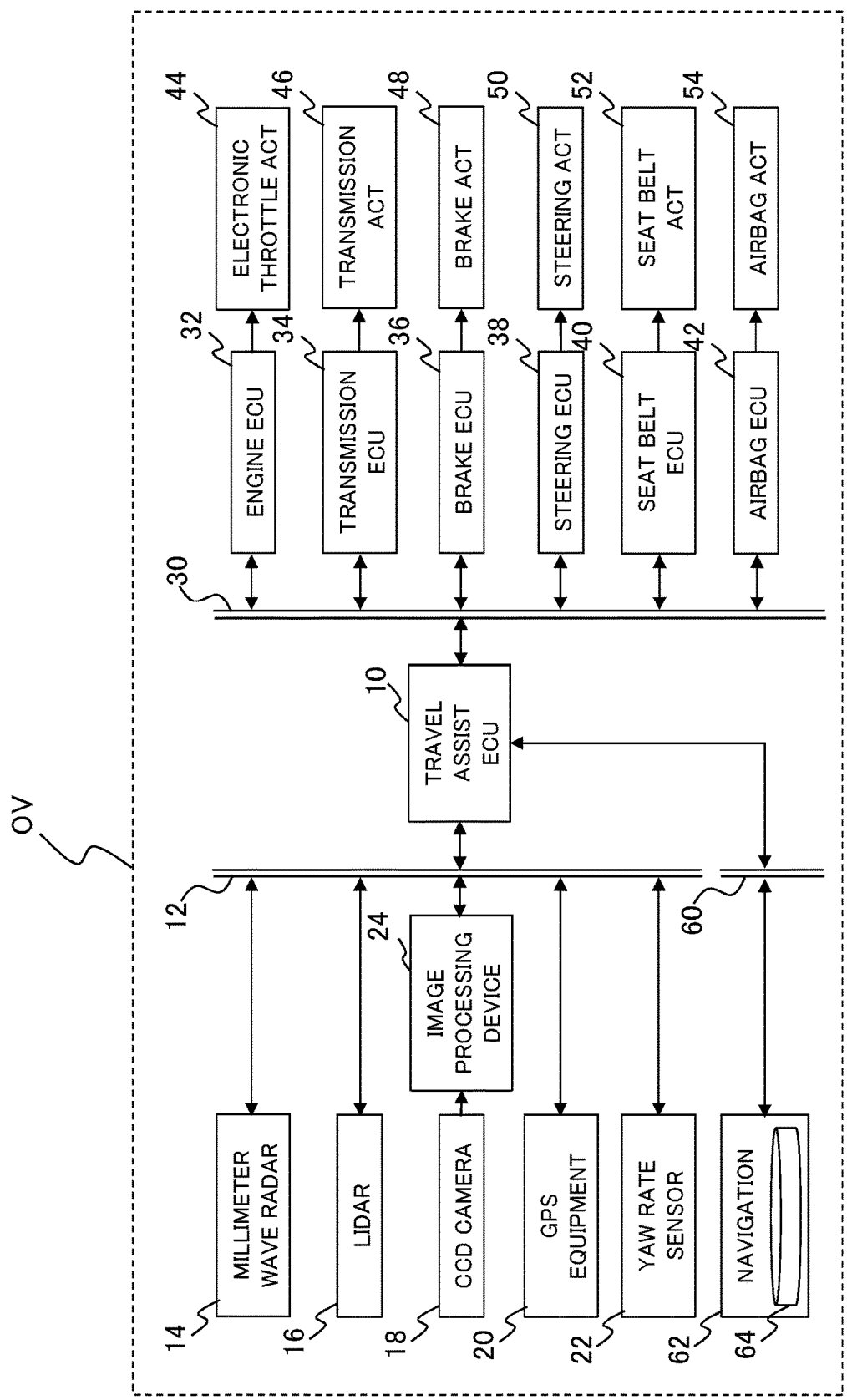
FIG. 1 is a block diagram for showing a configuration of a vehicle control system according to an embodiment of the present disclosure.

Hereinafter, an embodiment of the present disclosure will be described based on the accompanying drawings. Note that elements that are common to the respective drawings are denoted by the same reference characters and a duplicate description thereof is omitted. Further, the present disclosure is not limited to the embodiment described hereinafter.

1. Configuration of Vehicle Control System

FIG. 1 is a block diagram for describing a configuration of a vehicle control system according to the embodiment. A vehicle on which this control system is mounted will be referred to as an "own vehicle OV". The control system includes a plurality of electronic control units (i.e., controllers mainly composed of a computer, hereinafter also referred to as "ECUs"). A main control unit among the ECUs is a travel assist ECU 10. The travel assist ECU 10 execute a travel assist control of the own vehicle OV including an ACC control and a PCS control.

The travel assist ECU 10 is connected to a sensor system LAN 12 as well as other LANs in the own vehicle OV. A variety of sensor devices are connected to the LAN 12. The travel assist ECU 10 controls these sensor devices. In addition, the travel assist ECU 10 obtains from these sensor devices information on surroundings of the own vehicle OV and information on behavior of the own vehicle OV. In this control system, a millimeter wave radar 14, a LIDAR (Laser Imaging Detection and Ranging) 16, a CCD camera 18, a GPS (Global Positioning System) equipment 20 and a yaw rate sensor 22 are provided as these sensor devices.

The travel assist ECU 10 is also connected to a control system LAN 30. A variety of actuators are connected to this LAN 30. The various actuators are electronically controlled actuators. The ECUs 32 to 42 of these actuators and travel assist ECU 10 are connected via the LAN 30. In this control system, an electronic throttle ACT ("ACT" means "actuator") 44, a transmission ACT 46, a brake ACT 48, a steering ACT 50, a seat belt ACT 52 and an airbag ACT 54 are provided as these actuators. These actuators are operated based on control signals from the travel assist ECU 10.

The travel assist ECU 10 is also connected to an AV system LAN 60. The LAN 60 is a network relating to car navigation information and the like. Various devices are connected to this LAN 60. In the present system, these devices include a car navigation device 62. The car navigation device 62 includes an HDD (Hard Disk Drive) 64. In the HDD 64, map information data is stored. The map information data includes, for example, data on road position and road shape (e.g., road type such as straight and curve, and curvature of curve), intersection position and branch position.

The travel assist ECU 10 controls the actuators based on the information on surroundings of the own vehicle OV and behavior of the own vehicle OV such that the own vehicle OV prevents from colliding with the first preceding vehicle ILV. Even if the own vehicle OV likely to collide with the first preceding vehicle ILV, the travel assist ECU 10 controls the actuators so as to protect an occupant of the own vehicle OV properly. Such protect control includes an ACC (Auto Cruise Control or Adaptive Cruise Control) control and a PCS (Pre Clash Safety) control. In the ACC control, the actuator is operated such that the own vehicle OV travels at a constant speed or operated such that the own vehicle OV follows the first preceding vehicle ILV. In the PCS control, the actuator is operated before the collision based on a prediction thereof. These protect control have been already known. And these protect control are executed in this embodiment likewise according to the known technology.

2. Descriptions of System Components

The millimeter wave radar 14 detects a landmark by launching a millimeter wave (i.e., an example of an electromagnetic wave) around the own vehicle OV and receiving a reflective wave reflected by the landmark. According to the millimeter wave radar 14, not only a distance between the own vehicle OV and the landmark but also speed of the landmark relative to the own vehicle OV (i.e., relative speed of the landmark) are estimated. According to the millimeter wave radar 14, it is also possible to estimate bearing orientation of the landmark relative to the own vehicle (i.e., relative bearing of the landmark) based on a direction from which the reflective wave flies to the own vehicle OV. The distance between the own vehicle OV and the landmark and the relative bearing of the landmark are classified as positional information on the landmark. The millimeter wave radar 14 transmits the positional information and the relative speed the travel assist ECU 10 as landmark information.

The LIDAR 16 detects the landmark by irradiating a laser emitting pulsed around the own vehicle OV and receiving a reflected laser light from the landmark. Likewise the millimeter wave radar 14, according to the LIDAR 16, it is possible to estimate the distance between the own vehicle OV and the landmark and the relative bearing of the landmark. In other words, according to the LIDER 16, it is possible to obtain the positional information on landmark. In addition, according to the LIDER 16, it is possible to detect an outer shape of the landmark (e.g., height and width). The LIDAR 16 transmits the positional information (i.e., the distance and the relative bearing) and outer shape information on the landmark to the travel assist ECU 10 as landmark information.

The CCD camera 18 is a device to image an external situation of the own vehicle OV. The CCD camera 18 is provided, for example, on a back side of a windshield of the own vehicle OV. The CCD camera 18 may be a monocular camera or a stereo camera. The stereo camera has, for example, two imaging portions arranged to reproduce binocular parallax. Image information on the stereo camera includes information on a depth direction. The CCD camera 18 transmits the image information on the external situation of the own vehicle OV to an image processing device 24.

The image processing device 24 executes image processing based on the image information from the CCD camera 18. In the image processing, rough position of the landmark is grasped based on the landmark information from the millimeter wave radar 14. In the image processing, a portion moving integrally within a visual field of the CCD camera 18 is recognized as an image of the landmark with reference to the rough position of the landmark which was grasped. It should be noted that the specific process of the recognition processing is not particularly limited, and it is sufficient to obey a known processing. The image processing device 24 transmits outer shape information on the recognized landmark to the travel assist ECU 10.

In the present embodiment, the CCD camera 18 includes a camera capable of imaging a color image. Therefore, the image processing device 24 is able to recognize color of the landmark or color of a portion thereof. For example, when the landmark is the first preceding vehicle ILV, the image processing device 24 recognizes lighting state of an indicator lamp such as a brake lamp, a hazard lamp, a direction indicator of the first preceding vehicle ILV. The image processing device 24 transmits the recognized lighting state to the travel assist ECU 10 as image information on the first preceding vehicle ILV. Upon recognizing the lighting state of a preceding vehicle group LVG, the image processing device 24 transmits the image information to the travel assist ECU 10. The "preceding vehicle group LVG" mentioned here is a plurality of preceding vehicles LV traveling along the own lane ahead of the first preceding vehicle ILV.

The GPS equipment 20 receives signals from three or more GPS Satellites. Based on the received signal, the GPS equipment 20 measures a current location of the own vehicle OV (e.g., latitude and longitude of the own vehicle OV). The GPS equipment 20 transmits information on the current location of the measured own vehicle OV to the travel assist ECU 10.

The yaw rate sensor 22 detects angular velocity (yaw rate) which changes with direction change of the own vehicle OV. The yaw rate sensor 22 transmits the detected yaw rate information to the travel assist ECU 10. The yaw rate information is used to measure the current location of the own vehicle OV when the GPS equipment 20 is unable to receive radio waves from GPS Satellite.

3. Features of Control System

In the present embodiment, the information on the first preceding vehicle ILV (i.e., the landmark and image information) is applied to the travel assist control executed by the travel assist ECU 10. To the travel assist control, the information on the preceding vehicle group LVG (i.e., the landmark and image information) is also applied. When applying the information on the preceding vehicle group LVG, it is possible to start the operation of the actuator earlier as compared with a case of applying only information on the first preceding vehicle ILV. Therefore, it is possible to increase safety of an occupant of the own vehicle OV.

Figure 2:
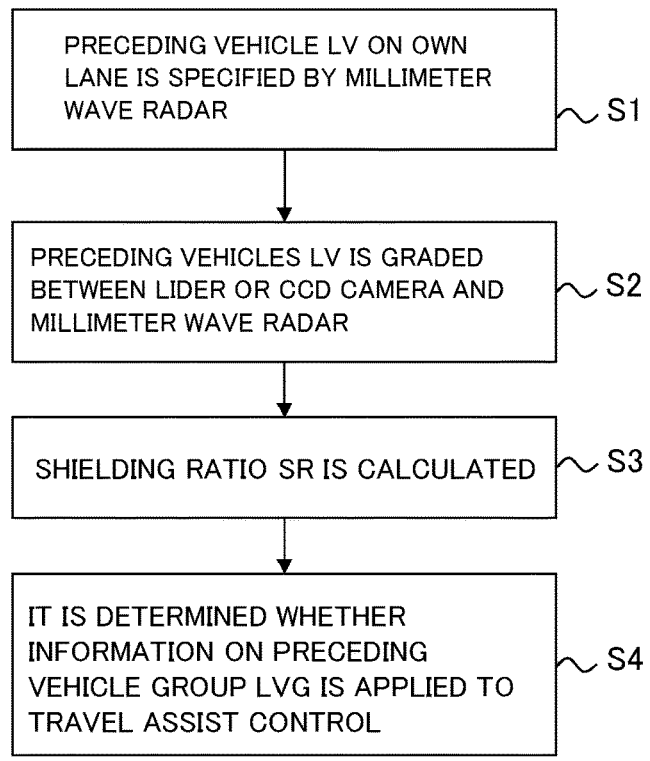
FIG. 2 is a diagram for describing an example of a travel assist program executed by a travel assist ECU.

The travel assist ECU 10 executes a travel assist program for applying the information on the preceding vehicle group LVG to the travel assist control. The travel assist program is stored in a memory of the travel assist ECU 10. The travel assist program will be explained with reference to FIGS. 2 to 5. FIG. 2 is a flowchart for describing an example of the travel assist program executed by the travel assist ECU 10. The routine shown in FIG. 2 is repeatedly executed at a predetermined control cycle while an ignition switch of the own vehicle OV is in active.

Figure 3:
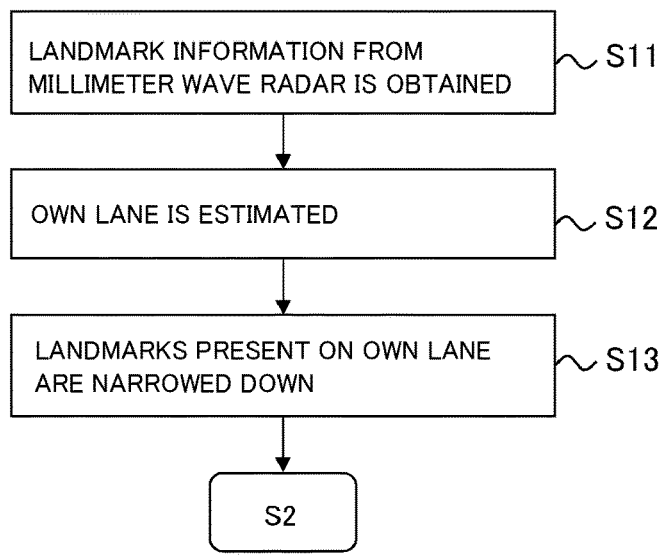
FIG. 3 is a flowchart for describing details of step S1 in FIG. 2.

In the routine shown in FIG. 2, first, specification processing of a preceding vehicle LV on the own lane is executed (step S1). FIG. 3 is a flowchart for describing details of the step S1. As shown in FIG. 3, in the step S1, various kinds of the landmark information from the millimeter wave radar 14 are obtained (step S11). Specifically, the various landmark information includes a distance D between the own vehicle OV and the landmark, the relative bearing of the landmark, and the relative speed of the landmark. Subsequent to the step S11, the own lane is estimated based on the information on the actual location from the GPS equipment 20, the yaw rate information from the yaw rate sensor 22, and the map information data in the HDD 64 (step S12). Subsequent to the step S12, landmarks present on the own lane are narrowed down based on the obtained various landmark information and the estimated own lane (step S13).

Figure 4:
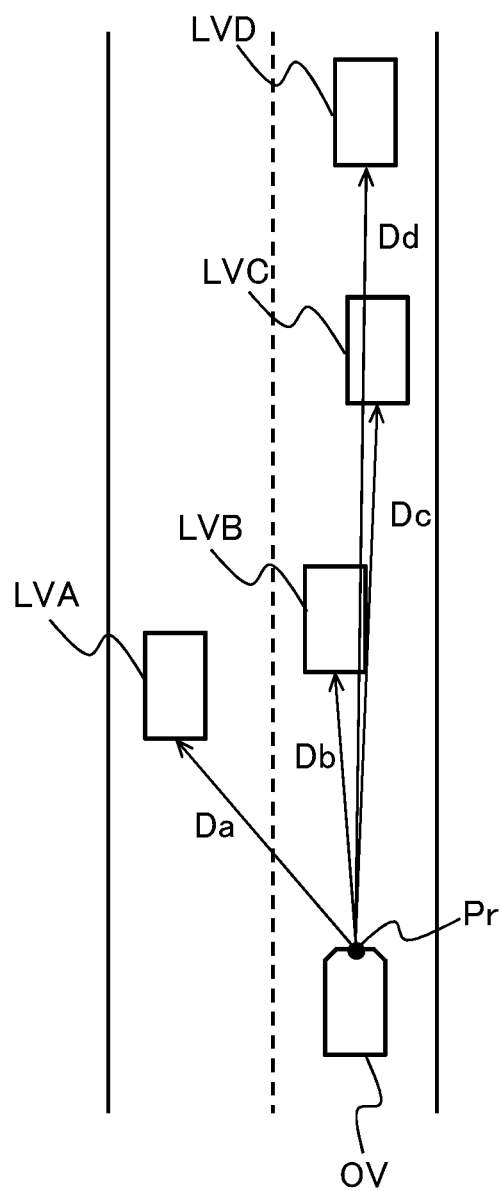
FIG. 4 is a diagram for describing an outline of processing of step S13 in FIG. 3.

FIG. 4 is a diagram for describing an outline of the processing in step S13. In FIG. 4, preceding vehicles LVA, LVB, LVC and LVD are drawn as candidates for the preceding vehicle LV on the own lane. In this figure, a distance Da between the own vehicle OV and the preceding vehicle LVA is the shortest. And the second shortest is a distance Db of the preceding vehicle LVB, the third shortest is a distance Dc of the preceding vehicle LVC and the fourth shortest is a distance Dd of the preceding vehicle LVD. However, the preceding vehicle LVA travels along a lane adjacent to the own lane. This is a result of the specification processing based on the information on the actual location, yaw rate information and map information data. Therefore, in the processing of the step S13, the preceding vehicle LVA is excluded from the candidates. As a result, the preceding vehicles LVB, LVC and LVD are specified as the preceding vehicles LV on the own lane.

In the routine shown in FIG. 2, subsequent to the processing of the step S1, the landmark information on the preceding vehicles LV on the own lane is graded (step S2). In the step S2, the landmark information from the millimeter wave radar 14 and the landmark information from the LIDER 16 are associated with each other. There is common information between the landmark information from the millimeter wave radar 14 and that from the LIDER 16 (i.e., the positional information on the landmark). Therefore, in the processing of the step S2, based on the common information, the landmark information on the preceding vehicles LV which was specified in the step S1 is associated with the landmark information from the LIDER 16. As a result, the outer shape information on the landmark which was included in the landmark information from the LiDAR 16 is added to that of the preceding vehicle LV which was specified in the step S1.

In the processing of the step S2, the landmark information from the millimeter wave radar 14 and the image information from the image processing device 24 may be associated with each other. Common information in this case is the relative bearing of the landmark. Therefore, the landmark information on the preceding vehicle LV which was specified in the step S1 is associated with the image information from the image processing device 24. As a result, the outer shape information on the landmark from the image processing device 24 is added to the landmark information on the preceding vehicle LV which was specified in the step S1.

In the routine shown in FIG. 2, subsequent to the processing of the step S2, a shielding ratio SR of the preceding vehicle LV is calculated for each preceding vehicle LV belonging to the preceding vehicle group LVG (step S3). This shielding ratio SR is defined as a ratio of a rear portion of a subject preceding vehicle LV belonging to the preceding vehicle group LVG to other preceding vehicles LV on the own lane when seeing the preceding vehicle group LVG from the own vehicle OV. The "other preceding vehicles LV" mentioned here is other preceding vehicles LV existing between the subject preceding vehicle LV and the own vehicle OV.

Figure 5:
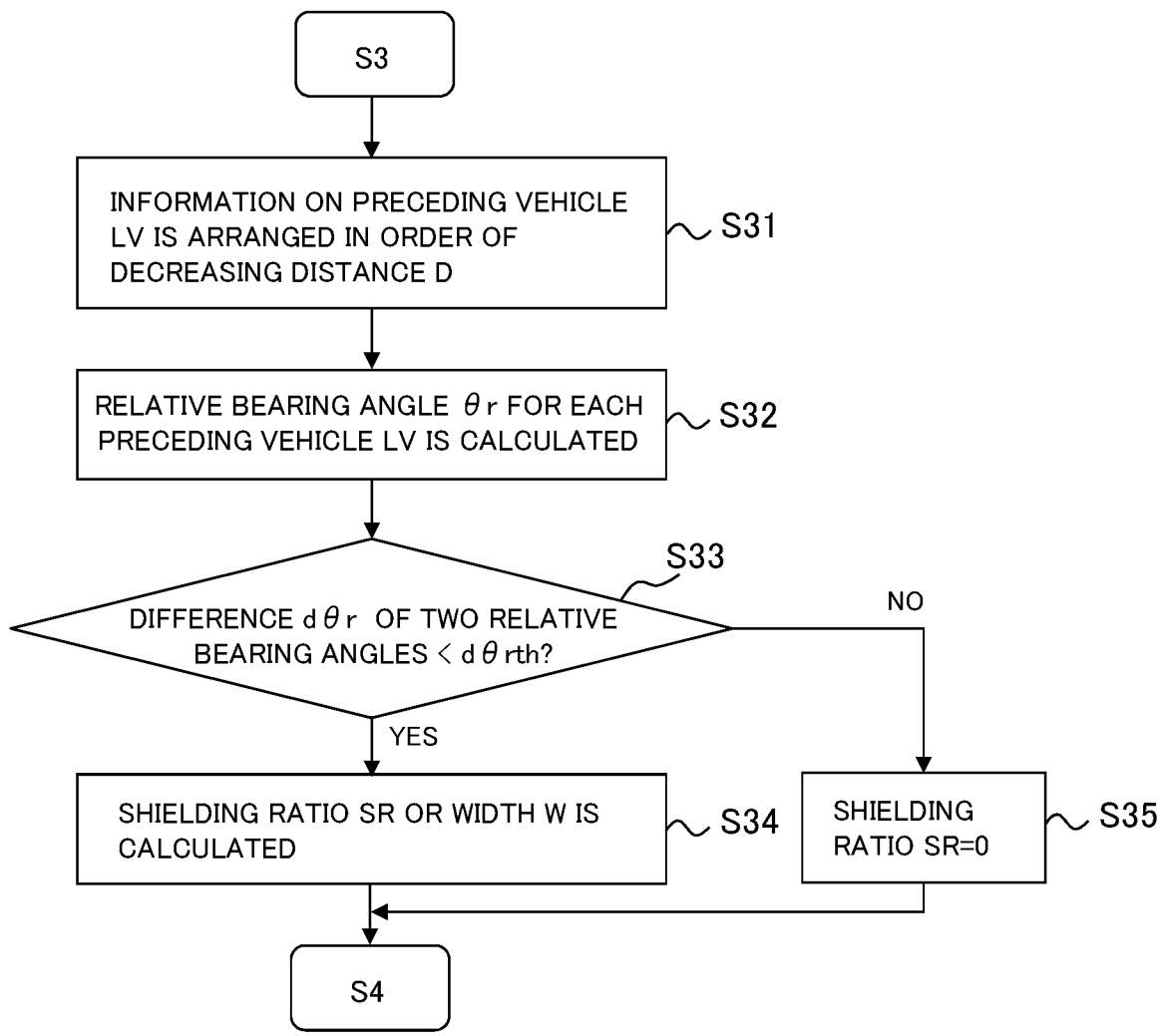
FIG. 5 is a flowchart for describing details of step S3 in FIG. 2.
Figure 6:
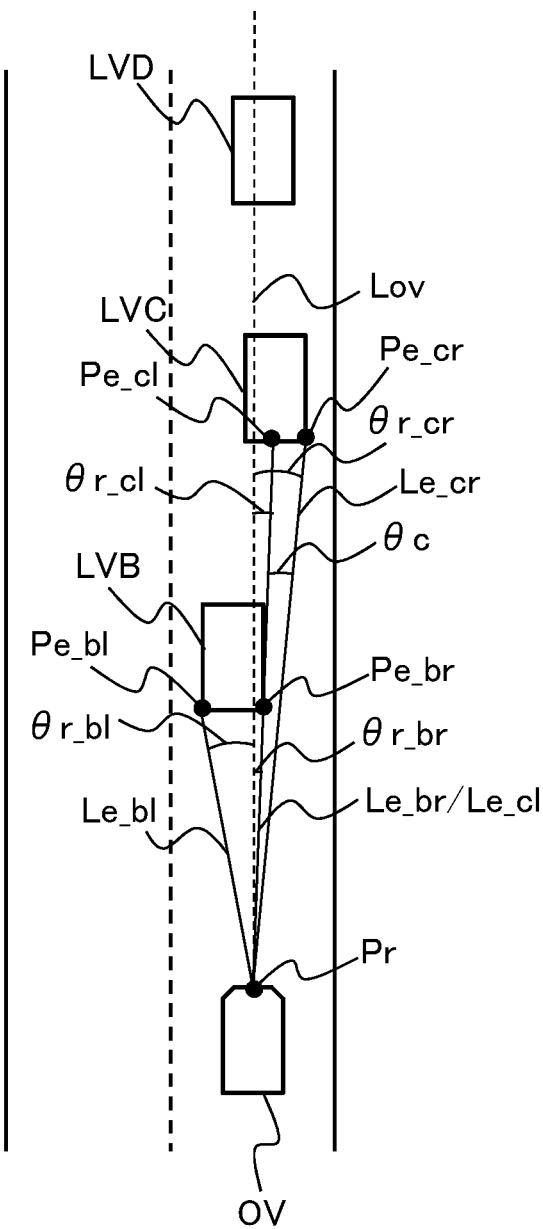
FIG. 6 is a diagram for describing an example of processing of step S3 in FIG. 2.

FIG. 5 is a flowchart for describing details of the step S3. In the routine shown in FIG. 5, first, the information on the preceding vehicle LV on the own lane (i.e., the landmark information and outer shape information) is arranged in order of decreasing distance D (step S31). In FIG. 6, the preceding vehicles LVB, LVC and LVD are drawn as the preceding vehicle LV on the own lane. In the step S31, the information on the preceding vehicles LVB, LVC and LVD are arranged in this order.

Subsequent to the step S31, relative bearing angle θr for each preceding vehicle LV is calculated (step S32). The relative bearing angle θr is defined as an angle between a line segment Le and a line Lov shown in FIG. 6. The line segment Le is a line segment connecting an end point Pe of the rear portion of the preceding vehicle LV and a reference point Pr of the own vehicle OV. The reference point Pr is, more specifically, an installation place of the LIDER 16 or the CCD camera 18. The line Lov is a line which passes through the reference point Pr and also extends in a travel direction of the own vehicle OV.

Herein, the end point Pe is specified based on the outer shape information on the preceding vehicle LV from the LIDER 16 or the image processing device 24. Therefore, when there is no end point Pe included in the outer shape information, the relative bearing angle θr is not calculated. As shown in FIG. 6, the rear portion of the preceding vehicle LVD is completely hidden by the preceding vehicles LVB and LVC. Therefore, the information on the preceding vehicle LVD after the processing of the step S2 does not include the outer shape information therefor. Therefore, in the step S32, the end point Pe of the preceding vehicle LVD is not specified and its relative bearing angle θr is not calculated.

On the other hand, as shown in FIG. 6, there is no other preceding vehicles LV between the preceding vehicle LVB and own vehicle OV. Therefore, a right end point Pe_br and a left end point Pe_bl of the rear portion of the preceding vehicle LVB are specified based on the outer shape information on the preceding vehicle LVB. Similarly, the right end point Pe_cr and left end point Pe_cl of the rear portion of the preceding vehicle LVC are identified. Therefore, line segments Le_br, Le_bl, Le_cr and Le_cl, both of which connects the reference point Pr and the corresponding end point Pe are specified, and the relative bearing angles θr_br, θr_bl, θr_cr, and θr_cl are calculated.

In the routine shown in FIG. 5, subsequent to the step S32, it is determined whether or not there is a combination of two relative bearing angles θr at which a difference dθr of the same two relative bearing angles θr is less than a threshold dθrth (step S33). The processing of the step S33 is executed on the preceding vehicles LV except for the first preceding vehicle ILV. Specifically, first, an attention is paid to the end point Pe of the rear portion of the subject preceding vehicle LV while excluding the first preceding vehicle ILV, the end point Pe of the rear portion and the relative bearing of the same subject preceding vehicle LV are extracted. Subsequently, two relative bearing angles θr corresponding to both of the extracted end points Pe are specified. The difference dθr is defined as a difference between the two relative bearing angles θr. Then, it is determined whether or not there is a combination of the two relative bearing angle θr at which the difference dθr is less than the threshold dθrth.

In the example shown in FIG. 6, four end points Pe are specified. Since the preceding vehicle LVB corresponds to the first preceding vehicle ILV, the right end point Pe_br and the left end point Pe_bl are excluded in this processing. When paying attention to the left end point Pe_cl of the preceding vehicle LVC, the end point which has the same relative bearing as the left end point Pe_cl corresponds to the right end points Pe_br and Pe_cr. Also, when paying attention to the right end point Pe_cr of the preceding vehicle LVC, the end point which has the same relative bearing as the right end point Pe_cr corresponds to the right end point Pe_br and the left end point Pe_cl. Therefore, a target of the calculation of the difference dθr is the combination of the two relative bearing angles θr_cr and θr_cl, or the combination of the two relative bearing angles θr_br and θr_cr or θr_br and θr_cl.

As shown in FIG. 6, when viewing from the own vehicle OV, the rear portion of the preceding vehicle LVC is partially hidden by the preceding vehicle LVB and the left end point Pe_cl substantially matches the end point Pe_br. Therefore, the difference dθr between relative bearing angles θr_cl and θr_br (i.e., dθr=θr_cl−θr_br) is approximately zero. In the processing of the step S33, an overlap is determined between the preceding vehicle LV of which the shielding ratio SR is targeted to calculate and the other preceding vehicles LV by setting such a value (roughly zero) to the threshold dθrth.

When the result of the processing of the step S33 is positive, the shielding ratio SR of the preceding vehicle LV corresponding to the end point Pe which was focused in the step S33 (hereinafter referred to as a "first end point Pe_1") is calculated (step S34). The processing of the step S34 is executed based on an included angle θ or a width W. The included angle θ is an angle formed by two line segments. One is a line segment connecting the reference point Pr and the first end point Pe_1. The other is a line segment connecting the reference point Pr and the end point Pe which forms a pair with the first end point Pe_1 (hereinafter referred to as a "a second end point Pe_2"). The width W is a length of a line segment connecting the first end point Pe_1 and the second end point Pe_2.

In the example shown in FIG. 6, a shielding ratio SRc of the preceding vehicle LVC corresponding to the left end point Pe_cl is calculated. The shielding ratio SRc is calculated based on an included angle θc shown in FIG. 6. The included angle θc is an angle formed between a line segment Le_cl and a line segment Le_cr. The shielding ratio SRc is calculated as a value obtained by dividing the included angle θc with a threshold θth. The threshold θth is set by a function having a distance D as its variable. As an example, when the distance D is zero, the threshold θth is 180°. And the threshold θth becomes smaller as the distance D becomes longer.

Figure 7:
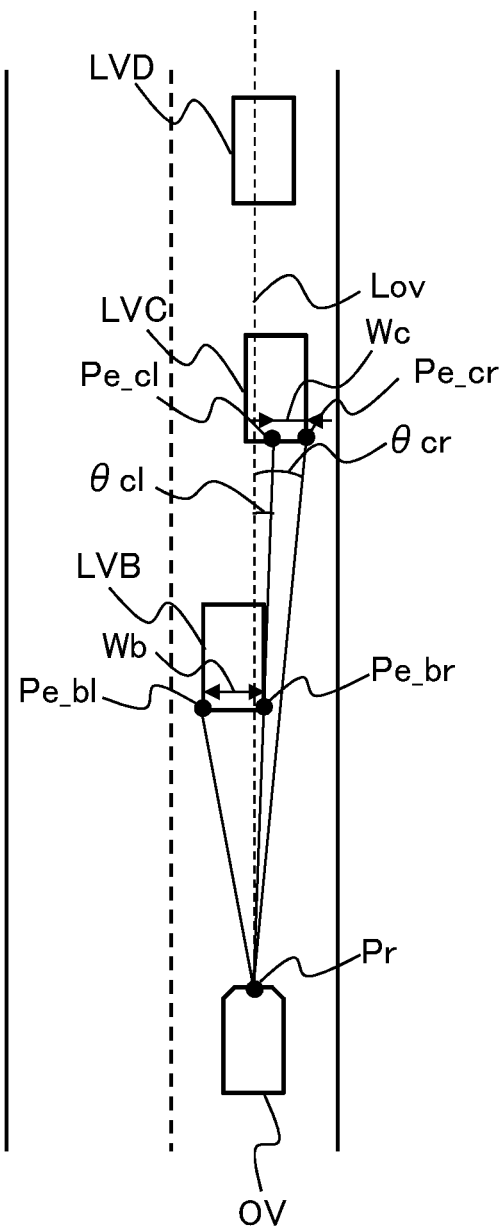
FIG. 7 is a diagram for describing another example of processing of step S3 in FIG. 2.

The shielding ratio SRc may be calculated based on a width Wc shown in FIG. 7 instead of the included angle θc shown in FIG. 6. The width Wc is a width of the line segment connecting the end point Pe_cl and the end point Pe_cr. The shielding ratio SRc is calculated as a value obtained by dividing the width Wc with a threshold Wth. The threshold Wth is set by a function having the distance D as a variable. As an example, when the distance D is zero, the threshold Wth is a general vehicle width of a general vehicle. And the threshold Wth becomes smaller as the distance D becomes longer.

When the result of the processing of the step S33 is negative, it is estimated that there is no overlap between the preceding vehicle LV of which the shielding ratio SR is targeted to calculate and the other preceding vehicles LV. Therefore, in this case, the shielding ratio SR is calculated as zero (step S35).

In the routine shown in FIG. 2, subsequent to the processing of the step S3, determination processing is executed whether or not the information on the preceding vehicle group LVG is applied to the travel assist control (step S4). The processing of the step S4 is executed by comparing the shielding ratio SR of the preceding vehicle LV calculated by the processing of the step S3 with a threshold SRth. For example, threshold SRth is set to a shielding ratio when only one tail lamp of a general vehicle is recognized and the other rear portions of the same vehicle are hidden.

When the shielding ratio SR is less than the threshold SRth, it is estimated that the information on the preceding vehicle LV is available. Therefore, in this case, it is determined to apply the information on the preceding vehicle LV to the travel assist control. On the other hand, when the shielding ratio SR is greater than or equal to threshold SRth, it is determined that the information on the preceding vehicle LV is not applied to travel assist control.

4. Effect by Control System

According to the routine shown in FIG. 2, it is possible to apply the information on the preceding vehicle LV belonging to the preceding vehicle group LVG to the travel assist control positively. Therefore, according to the control system, it is possible to start the operation of the actuator at a timing close to that when a driver of the own vehicle OV actually confirms the behavior of the preceding vehicle group LVG.

In the above embodiment, the CCD camera 18 and the image processing device 24 correspond to the "camera device" of the first aspect. The travel assist ECU 10 corresponds to the "controller" of the first aspect. The preceding vehicle LVB corresponds to the near-ahead vehicle of the first aspect. The preceding vehicle LVC corresponds to the far-ahead vehicle of the first aspect. The end point Pe_cl corresponds to the first end point of the first aspect. The end point Pe_cr corresponds to the second end point of the first aspect.

The line segment Le_cl corresponds to the first line segment of the second aspect. The line segment Le_cr corresponds to the second line segment of the second aspect.

The line segment between the end points Pe_cl and Pe_cr corresponds to the third line segment of the third aspect.

What is claimed is:

1. A vehicle control system comprising:
a millimeter wave radar which is configured to acquire positional information on a plurality of preceding vehicles traveling along an own lane in front of an own vehicle;
a camera device or a LIDER which is configured to acquire outer shape information on rear portions of the preceding vehicles;
an actuator which is configured to operate when there is a high possibility that the own vehicle collides with a first preceding vehicle traveling along the own lane ahead of the own vehicle; and
a controller which is configured to control the actuator based on the positional information and the outer shape information;
wherein the controller is further configured to:
grade the positional information and the outer shape information in association with each other and arrange the grading result as information on each preceding vehicle;
specify first and second end points of each rear portion in a vehicle's width direction based on the outer shape information which was associated with the positional information;
when the first and second end points are specified, calculate a first angle and a second angle for each preceding vehicle of which the first and second end points were specified, wherein the first angle is formed by a virtual line extending in a travel direction of the own vehicle through a reference point of the own vehicle and a line segment connecting the first end point and the reference point, and the second angle is formed by the virtual line and a line segment connecting the second end point;
when a difference between the first and second angles is smaller than a threshold in at least one of two preceding vehicles of which the first and second end points were specified, calculate a shielding ratio of a far-ahead vehicle having a longer distance from the own vehicle within the two preceding vehicles by a near-ahead vehicle having a shorter distance from the own vehicle within the two preceding vehicles; and
determine whether information on a preceding vehicle group traveling along the own lane ahead of the first preceding vehicle is applied to the control of the actuator based on the shielding ratio.

2. The vehicle control system according to claim 1, wherein the controller is configured to calculate the shielding ratio by dividing an included angle with a threshold, wherein the included angle is formed by a first line segment connecting the first end point of the far-ahead vehicle and the reference point and a second line segment connecting the second end point of the far-ahead vehicle and the reference point, and the threshold is set in accordance with a distance from the own vehicle to the far-ahead preceding vehicle.

3. The vehicle control system according to claim 1, wherein the controller is configured to calculate the shielding ratio by dividing a length of a third line segment with a threshold, wherein the third line segment is a line segment between the first and second end points of the far-ahead preceding vehicle, and the threshold is set in accordance with a distance from the own vehicle to the far-ahead preceding vehicle.

* * * * *